(12) United States Patent
Nicholas

(10) Patent No.: US 6,277,904 B1
(45) Date of Patent: Aug. 21, 2001

(54) TIRES/RETREADS INCLUDING TRINIDAD LAKE ASPHALT AS A COMPONENT THEREOF

(76) Inventor: Dolly Nicholas, 15 Hillcrest Drive, Battoo Lands, Marabella (TT)

(*) Notice: Subject to any disclaimer, the term of this patent is extended or adjusted under 35 U.S.C. 154(b) by 0 days.

(21) Appl. No.: 09/530,544

(22) PCT Filed: Oct. 29, 1998

(86) PCT No.: PCT/IB98/01735

§ 371 Date: Aug. 22, 2000

§ 102(e) Date: Aug. 22, 2000

(87) PCT Pub. No.: WO99/23166

PCT Pub. Date: May 14, 1999

Related U.S. Application Data

(60) Provisional application No. 60/064,100, filed on Nov. 3, 1997.

(51) Int. Cl.$^7$ ............................ C08L 101/00; C08L 95/00
(52) U.S. Cl. .............................. 524/59; 208/23; 152/151; 152/209.1
(58) Field of Search ............................... 524/59; 152/151, 152/209.1; 208/23

(56) References Cited

U.S. PATENT DOCUMENTS

| | | | |
|---|---|---|---|
| 3,179,149 | * 4/1965 | Barton et al. | .......................... 152/330 |
| 3,247,881 | * 4/1966 | Barton et al. | .......................... 152/330 |
| 4,250,067 | * 2/1981 | Bresson . | |
| 5,328,943 | * 7/1994 | Isobe et al. | ............................ 524/70 |
| 5,711,796 | * 1/1998 | Grzybowski et al. | ............ 106/281.1 |

FOREIGN PATENT DOCUMENTS

| | | |
|---|---|---|
| 447416 | * 5/1936 | (GB) . |
| 983357 | * 2/1965 | (GB) . |
| 1039053 | * 8/1966 | (GB) . |

\* cited by examiner

*Primary Examiner*—Margaret Medley
(74) *Attorney, Agent, or Firm*—Nixon & Vanderhye P.C.

(57) ABSTRACT

New or improved tires and retreads for tires which incorporate Trinidad Lake Asphalt (TLA), also known as Trinidad Natural Asphalt or Epure, as a raw material therein. TLA is advantageously used in addition to or as a substitute for other known component(s) or raw material(s) in tire/retread formulations. As with other components, the amount of TLA used can vary depending on the performance characteristics desired. TLA can be added at any stage of the tire manufacturing/retread process for the purpose of reducing or replacing known raw materials or as a separate raw material to provide new and improved formulations for tires/retreads.

12 Claims, No Drawings

TIRES/RETREADS INCLUDING TRINIDAD LAKE ASPHALT AS A COMPONENT THEREOF

RELATED APPLICATIONS

The instant application is a 371 of PCT/IB98/01735, dated Oct. 29, 1998 now WO99/23166 dated May 14, 1999 which claims the benefit of the filing date of U.S. provisional patent application Ser. No. 60/064,100 filed Nov. 3, 1997.

BACKGROUND OF THE INVENTION

The present invention relates generally to the field of tire/retread manufacture, and, more particularly, to improved tires/retreads which include Trinidad Lake Asphalt as a component or raw material therein to enhance the performance and/or other characteristics of the tires/retreads.

Trinidad Lake Asphalt (hereafter "TLA"), also known as Trinidad Natural Asphalt or Epure, is a naturally occurring Lake Asphalt which is found in the island of Trinidad in the West Indies. This natural phenomenon, TLA, is different from and is not to be confused with tar sands, or tar pits or even asphalt which is a natural or mechanical mixture in which bitumen is associated with mineral matter. An accepted definition which has been given to TLA is: an asphalt which, as found in nature, is in a condition of flow or fluidity.

As dug from the earth, TLA contains thirty percent (30%) water which is normally removed through refining under conditions of temperature. The molten material is then filtered and typically packed into silicone treated hardboard drums. The drums are typically silicone treated as the temperature at which the molten TLA is filled into the drum is generally around 163° C. TLA has been advantageously used in the past in paving or road building materials and applications. TLA is non-carcinogenic, is an entirely natural material, and is environmentally friendly.

In the manufacture of tires/retreads for use, for example, in connection with ground or air vehicles or the like, different compounding formulations are used. These formulations include a variety of ingredients or raw materials. For example, Asphaltenes may be used as a raw material. Process oils may also be used as a raw material. Carbon black may also be used as a raw material and is often used for reinforcing and/or networking purposes. Different types or quantities of carbon black provide different performance specifications for tires.

Generally speaking, tires are made up of approximately twenty or more different constituents or raw materials. Many different formulations of these raw materials are used. In fact, at least eighty different formulations are readily recognized in the industry for use in tire manufacturing. Different formulations are used for different parts of the tire. More particularly, different formulations are used for the tread portion, sidewall portion, and other portions of the tire. All of the formulations are vulcanized or fused during the tire manufacturing process to form the tire. Each formulation provides different performance characteristics for the tire. Such formulations are also used to make retreads for tires. Retreads represent only the tread portion of the tire and are vulcanized onto a used and/or existing tire to provide a tire with new tread. Silica and/or other raw materials are also used in tire/retread manufacture as a filler and/or as a networking agent. When silica is used in tire manufacture for networking purposes, a coupling agent is also used.

As a person skilled in the art readily understands, tire manufacturing involves adding polymer, networking agents, plasticisers, process oils, resins and/or fillers in a mixer, such as a Banbury mixer, and then the various components are vulcanized or fused to provide a homogeneous blended material which is used in a known manner, such as in a molding operation, to produce tires and retreads.

It is known in the tire industry that the compounds used in the tire formulation have an effect on the viscoelastic properties of the resulting tire. For example, plasticizers and process oils, like polymers, can have various glass transition temperatures (Tg) depending on the chemical structures. Paraffinic process oils and plasticisers such as dioctyl phthalate (DOP) have very regular structures and hence have low Tg's. Aromatic oils have large ring structures that hinder rotational motion and have high Tg's. The amount of change in the overall compound Tg is dependent on the oil's volume and Tg and can be determined in accordance with known formulas. The addition of oils also broadens the compound Tg range. In addition, the addition of oils or plasticizers have a softening effect on the compound and reduce the E'(G') elastic modulus and the E*(G*) complex modulus.

Resins also effect the viscoelastic properties of tires when used in tire formulations. For example, Phenolic tackifying resins and most hydrocarbon resins have higher Tg's than the compound polymer system and tend to raise the overall Tg and the tan delta of the compound. The above resins have a softening effect and reduce the E'(G') elastic modulus and the E*(G*) complex modulus. Crosslinked phenolic reinforcing resins and high styrene resins increase the E'(G') elastic modulus and the E*(G*) complex modulus. At higher temperatures (90+° C.), the high styrene resins will go through the Tg have a softening effect on the compound. The phenolic reinforcing resins are permanently crosslinked with a methylene donor such as HMT or HMMM and do not soften at higher temperatures. A very low hysteresis, high hardness compound, can be created with a crosslinked phenolic reinforcing resin and very low levels of carbon black and silica.

Hysteresis in the bulk of a rubber product is defined as the energy lost when the rubber product is deformed and then released. Hysteresis is the result of internal friction and is evident as heat. Hysteresis is commonly measured as a temperature increase in a flexed specimen (heat build-up). It is widely known that when carbon black is added to a gum rubber, the rubber is generally reinforced, exhibiting increases in such properties as tensile strength, abrasion resistance, tear strength, modulus, etc. It is also widely known that carbon black increases the hysteresis of a rubber product.

While known formulations for tires and retreads have provided high quality products for many years, there is certainly room for improvement in such formulations and the resulting tire/retread products. Thus, a need exists for new and/or improved formulations and/or raw materials which are used in the manufacture of tires/retreads.

SUMMARY OF THE INVENTION

It is therefore a primary object of the present invention to provide new and/or improved range of tire and retread products.

A further object of the present invention is to provide new and/or improved range of formulations for producing tires and retreads.

Another object of the instant invention is to provide tires and retreads with new and/or improved performance characteristics.

Yet another object of the instant invention is to provide new and/or improved range of tires and retreads which are more environmentally friendly and economically viable than known tires and retreads.

A further object of the invention is to provide new and/or improved range of tires and retreads which do not require coupling agents during the manufacture thereof.

A further object of the instant invention is to provide new and/or improved range of tires and retreads which use the latest in siloxane technology.

Yet another object of the instant invention is to provide new and/or improved tire and retreads which use the same manufacturing conditions as known tires and retreads.

Yet another object of the instant invention is to provide new and/or improved tires and retreads with customizable performance characteristics, such as hysteresis.

Yet another object of the instant invention is to provide new and/or improved tires and retreads which can be manufactured using non-molten mixers (e.g. Banbury, high shear internal mixers, etc.) or wet or dry or molten mixers (heaters, etc.).

These and other objects and advantages are achieved by the present invention, which provides improved tires and retreads for tires made from a homogeneous admixture of polymer and Trinidad Lake Asphalt (TLA). In accordance with the instant invention, TLA can be added at any stage of the tire manufacturing/retread process for the purpose of reducing or replacing known raw materials or as a separate raw material to provide new and/or improved formulations for tires/retreads.

Other features, objects and advantages of the subject invention will become apparent from a study of the following specification which describes preferred embodiments of the instant invention and is not meant to be interpreted as limiting the scope of the instant invention beyond the true scope of the appended claims herein.

DETAILED DESCRIPTION OF THE PREFERRED EMBODIMENTS

As explained above, Trinidad Lake Asphalt (TLA), also known as Trinidad Natural Asphalt or Epure, is a naturally occurring Lake Asphalt which is found in the island of Trinidad in the West Indies. In accordance with the present invention, new and/or improved tires and retreads for tires are provided by including TLA as a component or raw material in the tire formulation to enhance the performance and/or other characteristics of tires and retreads.

In accordance with the instant invention, it has been determined that TLA can be advantageously used as a component or raw material in tire/retread manufacture with new and unexpected results. More particularly, the instant inventor has discovered that TLA can be used as a substitute or in addition to known tire manufacturing materials to provide new and improved tire and retread products.

In it broadest sense, the instant invention is directed to the use of TLA as a raw material in the manufacture of a tire or retread. More particularly, the invention involves tires or retreads made from polymer, other known raw material(s), such as fillers (e.g., carbon black, silica, resin, etc.), and at least some quantity of TLA. The TLA can be added at any stage of the tire manufacturing/retreading process. For Example, TLA can be added during mixing of the networking agents with the polymer, during mixing of the plasticisers and/or resins into the formulation, at the time of vulcanization, and/or at any other suitable time or times during the tire/retread manufacturing process.

In an exemplary compound tire formulation, the TLA is added as another ingredient into the Banbury mix. No coupling agents are required for the reaction because the chemistry of TLA is such that, at the temperatures used in the Banbury mix (typically 290° F.–320° F., but may be between 90° C. and 1000° C.), an intimate homogeneous blended material or admixture results. In other words, in TLA the silica which occurs is already coupled, therefore when TLA is used to manufacture tires, no coupling agents are required for the purpose of networking. Moreover, the TLA completely solubilizes throughout the material, because TLA has both a bituminous and mineral matter fraction.

As explained in detail above, known fillers such as carbon black, silica, clays, etc. are added into the tire formulation in order to meet different and predetermined performance criteria. These fillers may be any suitable solid, liquid or gas. Plasticisers, resins, oils, etc. are also added for hysteresis purposes. In accordance with the instant invention, TLA is used in addition to or as a substitute for any of the known raw materials used in tire formulations to achieve the same or similar or better results. The use of the TLA is wide ranging and, depending on the performance characteristics (hysteresis) desired, the particular quantity or volume of TLA used can vary, as one skilled in the art will understand from the description of the invention herein. It is noted that there maybe no special manufacturing conditions required when the TLA is used. In other words, the TLA may simply be added like other known raw materials into the compound tire formulation and the tire/retread manufacturing process otherwise may remain the same. Use of the TLA enables use of the latest siloxane or silica technology.

The formulation including the TLA can be mixed by using a non-molten mixer (e.g. Banbury, high shear internal mixers, etc.), molten mixers (heaters, etc.), or wet or dry mixers. The only requirement is that an intimate homogeneous blended material or admixture is made with the polymer, TLA and other raw materials. The complete mixing enables the appropriate bonding and reactions to occur between the components of the formulation, as one skilled in the art will understand from the description herein. With the homogeneous blended material there is no separation of TLA fractions and both the mineral matter and bitumen portions thereof are solubilized (mixed intimately) throughout the material. It is noted that the term solubilized is used herein to mean total reaction and mixing as opposed to dissolving.

In as much as processes for making tires and retreads are well known to persons skilled in the art, no further specific details are provided herein with respect to the particular known steps of tire/retread manufacture. The instant invention can be used with any known tire/retread manufacturing process by adding TLA to the tire formulation in addition to or as a substitute for known components, or otherwise the use of TLA creates a new process for the purpose of tire/retread manufacture.

While the preferred forms and embodiments of the invention have been illustrated and described, it will be apparent to those of ordinary skill in the art that various changes and modifications may be made without deviating from the inventive concepts and true spirit of the invention as set forth above, and it is intended by the appended claims to cover all such changes and modification which come within the full scope and true spirit of the invention.

What is claimed is:

1. A tire, wherein at least a portion of said tire comprises an admixture of polymer and Trinidad Lake Asphalt.

2. A tire as defined in claim 1, further comprising at least one raw material in said admixture.

3. A tire as defined in claim 2, wherein said raw material is a networking agent.

4. A tire as defined in claim 2, wherein said raw material is a plasticizer.

5. A tire as defined in claim 2, wherein said raw material is a resin.

6. A tire as defined in claim 2, wherein said raw material is a filler.

7. A tire as defined in claim 1, wherein said admixture is a homogeneous admixture.

8. A tire as defined in claim 6, wherein said filler is selected from the group consisting of carbon black, silica and resin.

9. A tire as defined in claim 1, wherein said Trinidad Lake Asphalt is present in said admixture in a quantity selected to provide predetermined characteristics for said tire.

10. A tire as defined in claim 1, wherein said admixture further includes a networking agent, a plasticizer and a resin.

11. A tire as defined in claim 10, wherein said admixture is a homogeneous admixture.

12. A tire as defined in claim 11, wherein said admixture further includes a filler.

\* \* \* \* \*